United States Patent
Muratov

(10) Patent No.: US 10,581,281 B2
(45) Date of Patent: Mar. 3, 2020

(54) IN SITU COIL PARAMETER MEASUREMENTS AND FOREIGN OBJECTS DETECTION

(71) Applicant: MediaTek Inc., Hsin-Chu (TW)

(72) Inventor: Vladimir A. Muratov, Manchester, NH (US)

(73) Assignee: MediaTek Inc., Hsin-Chu (TW)

( * ) Notice: Subject to any disclaimer, the term of this patent is extended or adjusted under 35 U.S.C. 154(b) by 403 days.

(21) Appl. No.: 15/297,226

(22) Filed: Oct. 19, 2016

(65) Prior Publication Data
US 2017/0117756 A1 Apr. 27, 2017

Related U.S. Application Data

(60) Provisional application No. 62/245,383, filed on Oct. 23, 2015.

(51) Int. Cl.
*H02J 50/12* (2016.01)
*H02J 50/60* (2016.01)
*H02J 7/02* (2016.01)
*H02J 7/00* (2006.01)

(52) U.S. Cl.
CPC .............. *H02J 50/60* (2016.02); *H02J 7/025* (2013.01); *H02J 50/12* (2016.02); *H02J 7/0052* (2013.01); *H02J 2007/0059* (2013.01)

(58) Field of Classification Search
CPC .................................. H02J 50/12; H02J 50/60
See application file for complete search history.

(56) References Cited

U.S. PATENT DOCUMENTS

| | | | |
|---|---|---|---|
| 9,057,753 B2 | 6/2015 | Nakano et al. | |
| 9,178,361 B2 | 11/2015 | Liu et al. | |
| 9,294,153 B2 | 3/2016 | Muratov et al. | |
| 10,199,881 B2 | 2/2019 | Muratov et al. | |
| 2010/0222010 A1* | 9/2010 | Ozaki | H02J 5/005 455/77 |
| 2014/0077617 A1 | 3/2014 | Nakano et al. | |
| 2015/0285926 A1* | 10/2015 | Oettinger | H02J 5/005 307/104 |
| 2015/0349541 A1* | 12/2015 | Yamamoto | G01V 3/10 307/104 |
| 2017/0117755 A1 | 4/2017 | Muratov et al. | |
| 2017/0229914 A1* | 8/2017 | Oh | H02J 50/12 |
| 2018/0241257 A1 | 8/2018 | Muratov et al. | |
| 2019/0199142 A1 | 6/2019 | Muratov et al. | |

OTHER PUBLICATIONS

U.S. Appl. No. 15/244,107, filed Aug. 23, 2016, Muratov et al.
U.S. Appl. No. 16/228,556, filed Dec. 20, 2018, Muratov et al.
U.S. Appl. No. 15/957,704, filed Apr. 19, 2018, Muratov et al.

* cited by examiner

*Primary Examiner* — Fritz M Fleming
(74) *Attorney, Agent, or Firm* — Wolf, Greenfield & Sacks, P.C.

(57) ABSTRACT

A foreign object detection method and apparatus for performing same. A wireless power transmitter has a matching network and transmit coil. The method includes, stimulating the transmit coil with electrical signals at a plurality of frequencies, measuring a response of the transmit coil to the electrical signals, determining a quality factor and/or resonant frequency of the transmit coil based upon the measured response, and analyzing the quality factor and/or resonant frequency to determine whether a foreign object is coupled to an electromagnetic field generated by the transmit coil.

22 Claims, 18 Drawing Sheets

IN SITU COIL PARAMETER MEASUREMENTS AND FOREIGN OBJECTS DETECTION

CROSS-REFERENCE TO RELATED APPLICATIONS

This application claims priority to U.S. provisional application Ser. No. 62/245,383 filed Oct. 23, 2015, titled "IN SITU COIL PARAMETER MEASUREMENTS AND FOREIGN OBJECT DETECTION," which is hereby incorporated by reference in its entirety.

BACKGROUND

1. Technical Field

The techniques described herein relate generally to wireless power delivery, and particularly to detection of foreign objects in the field produced by a wireless power transmitter.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism.

MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

Some embodiments relate to a foreign object detection method. A wireless power transmitter has a matching network and a transmit coil. The method includes stimulating the transmit coil with electrical signals at a plurality of frequencies, measuring a response of the transmit coil to the electrical signals, determining a quality factor and/or resonant frequency of the transmit coil based upon the measured response, and analyzing the quality factor and/or resonant frequency to determine whether a foreign object is coupled to an electromagnetic field generated by the transmit coil. Some embodiments relate to at least one non-transitory computer readable storage medium having stored thereon instructions, which, when executed by a processor, perform the method.

Some embodiments relate to an apparatus that performs foreign object detection. The apparatus includes a probing circuit configured to stimulate a transmit coil with electrical signals at a plurality of frequencies and measure the response of the transmit coil to the electrical signals. The apparatus also includes a controller configured to determine a quality factor and/or resonant frequency of the transmit coil based upon the measured response and analyze the quality factor and/or resonant frequency to determine whether a foreign object is coupled to an electromagnetic field generated by the transmit coil.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wireless power transfer can be degraded due to the presence of a foreign object in the field produced by the wireless power transmitter. Conductive objects such as metallic objects may absorb power due to the inducement of eddy currents in the conductive object. The presence of such an object can significantly degrade the efficiency of the wireless power transmission. If a metal object is present, efficiency may be reduced substantially (e.g., from 90% to 40%). Further, due to the power absorbed, the temperature of the object may increase significantly, which may be undesirable. Techniques have been developed for sensing the presence of a foreign object. However, prior techniques for sensing the presence of foreign objects have various disadvantages, including limited detection capability at low power levels, a lengthy detection process which wastes power, and/or the need to add additional circuitry or coils which may lead to additional complexity and/or expense.

The techniques and devices described herein enable the detection of a foreign object using relatively low power levels. In some embodiments, detection may be performed by probing the response of the wireless power transmitter coil at different frequencies and analyzing the response For example, the quality factor Q and/or the resonant frequency may be determined based upon the measurements. If the quality factor Q and/or the resonant frequency deviates from an anticipated value, a foreign object may be determined to be present. In contrast to prior techniques for performing foreign object detection, the techniques described herein can provide higher efficiency by utilizing low power levels and/or a smaller number of measurements. Prior to discussing such techniques in further detail, an example of a wireless power system will be described.

Figure 1:
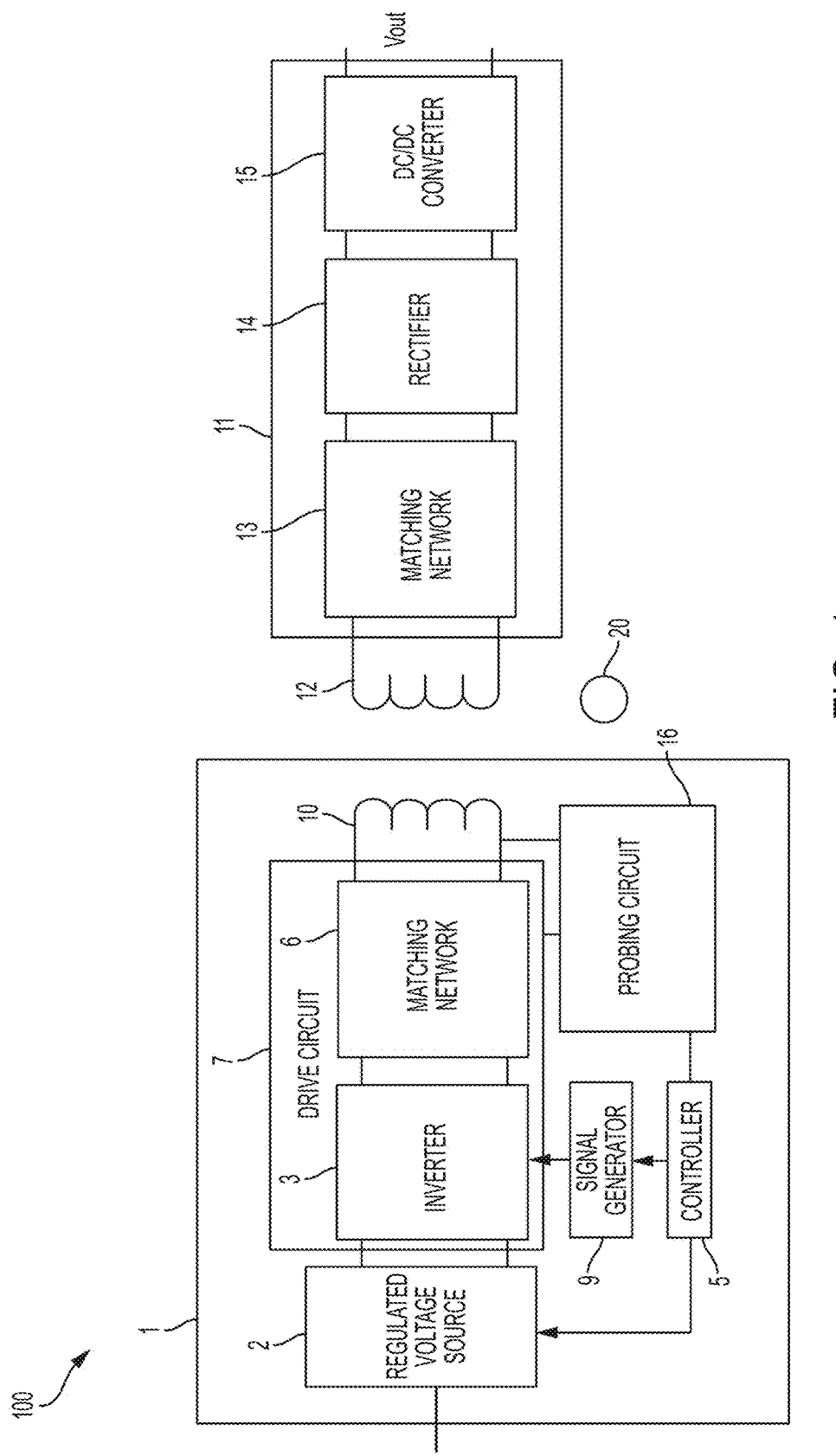
FIG. 1 shows a block diagram of a wireless power system including a wireless power transmitter and a wireless power receiver.

FIG. 1 shows a block diagram of a wireless power system 100 including a wireless power transmitter 1 and a wireless power receiver 11. The wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments, the DC/DC converter 15 can be replaced by a linear regulator or battery charger, or eliminated altogether.

As shown in FIG. 1, if a conductive foreign object 20 enters the field produced by the transmit coil 10 of the wireless power transmitter 1, the wireless power transmission efficiency may be degraded and/or the conductive foreign object 20 may undergo significant heating. Examples of conductive foreign objects 20 include coins, paperclips, and keys, by way of illustration.

According to the techniques described herein, the wireless power transmitter 1 may be controlled to perform foreign object detection prior to wireless power transmission. Performing foreign object detection allows the wireless power transmitter to determine whether or not to perform wireless power transmission. As shown in FIG. 1, the wireless power transmitter 1 may include a probing circuit 16. Probing circuit 16 may include circuitry for applying probing signals to the transmit coil 10 and measuring one or more signals of drive circuit 7 and/or transmit coil 10 produced in response to the probing signals. By setting the probing signals to selected frequencies, and analyzing one or more measured signals produced in response, the quality factor and/or resonant frequency can be measured, and it can be determined whether a foreign object is present in the field produced by the transmit coil 10.

Figure 2:
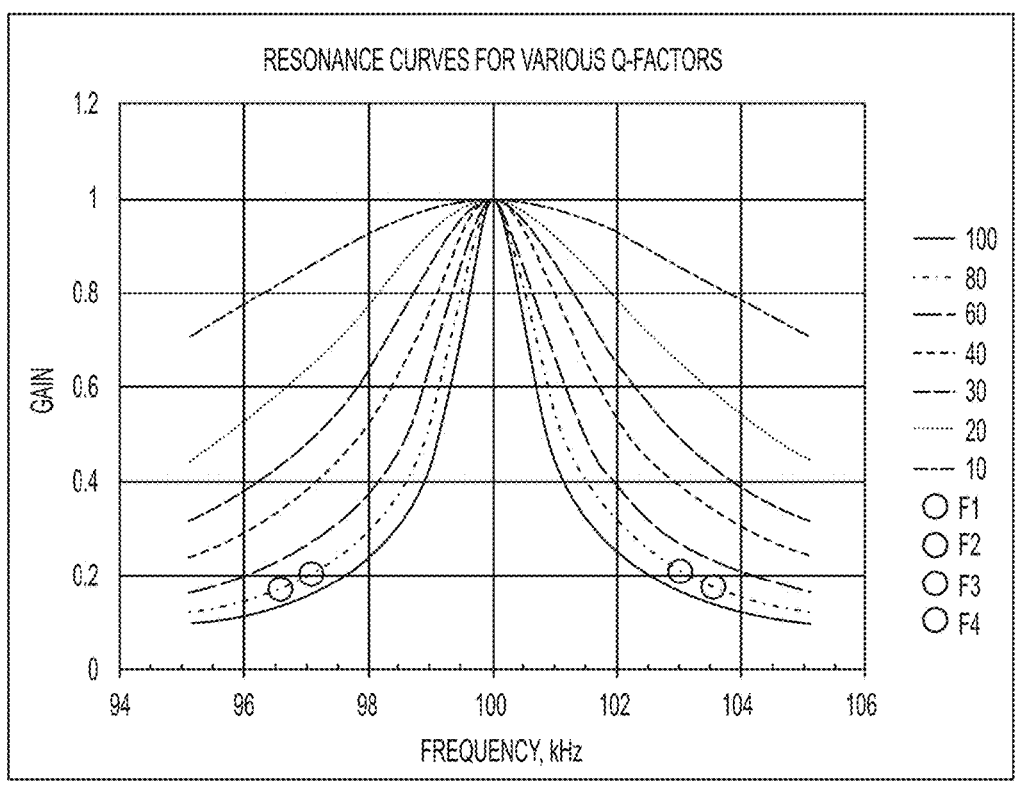
FIG. 2 shows the gain of the transmitter circuit including the drive circuit and transmit coil versus frequency, for different quality factors Q.

When a foreign object is present, the quality factor Q of the transmit coil decreases. FIG. 2 shows the gain of the transmitter circuit including the drive circuit 7 and transmit coil 10 versus frequency, for different quality factors Q. Each quality factor Q has a different curve of gain vs. frequency. The gain is the highest at the resonant frequency, which in the example of FIG. 2 is 100 kHz. The quality factor Q can be determined as follows. Probing signals are applied to the transmit coil 10 at a plurality of frequencies, and the gain of the resonant circuit is measured at each frequency. Doing so identifies a plurality of measurements of gain vs frequency, which would be represented by points in the plot of FIG. 2. The quality factor can be determined based on the points by fitting the points to a quality factor curve that most closely matches the points. Any suitable curve fitting algorithm may be used.

If the quality factor and/or resonant frequency is close to the anticipated quality factor and/or resonant frequency, it may it may be determined that no foreign object is present. Conversely, if the quality factor and/or resonant frequency is not close to what is anticipated, it is determined that a foreign object is present. Whether or not the measured quality factor and/or resonant frequency is close to the anticipated value may be determined based on whether the difference between the measured value and the anticipated value exceeds a threshold. Wireless power transmission can be enabled or inhibited based on this analysis. If a foreign object is determined to be present, wireless power transmission can be disabled. If a foreign object is determined not to be present, wireless power transmission may be enabled.

Figure 3:
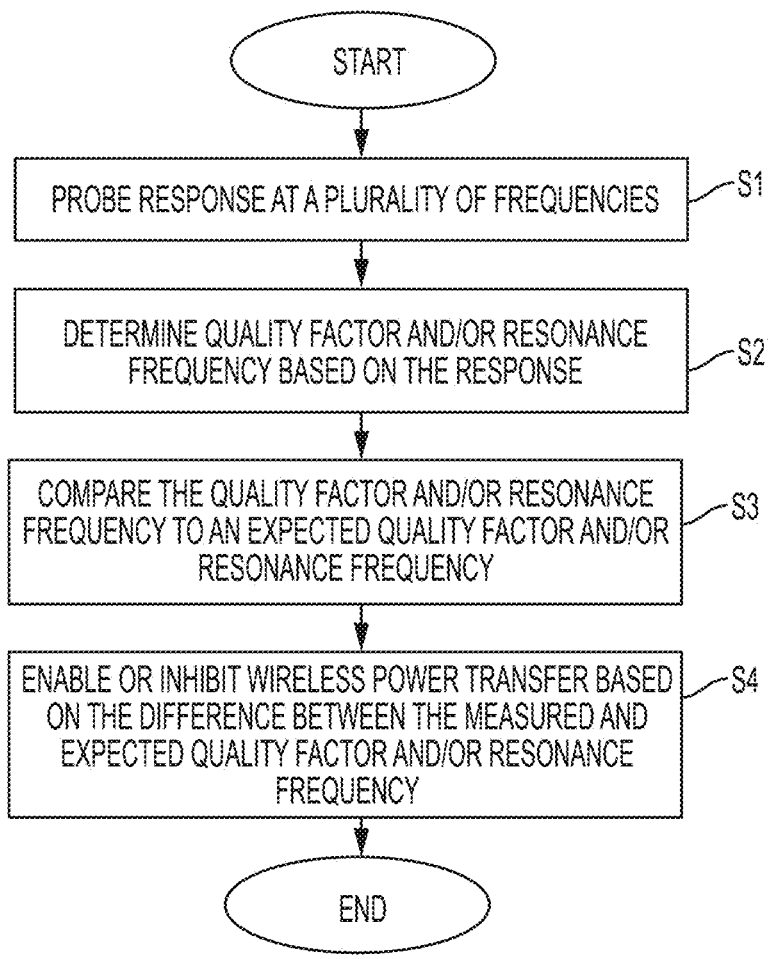
FIG. 3 shows a flowchart of a method of performing foreign object detection, according to some embodiments.

FIG. 3 shows a flowchart of a method of performing foreign object detection, according to some embodiments. Such a method may be performed by the wireless power transmitter 1. Specifically, controller 5 may be configured to control performing the method. In step S1, the response of the transmitter coil 10 may be probed at a plurality of frequencies. Step S1 may include driving the transmitter coil 10 with probing signals, and measuring one or more electrical parameters of the transmitter coil 10 and/or the driver circuit 7, such as voltage and/or current. In some embodiments, as discussed below, the transmitter coil 10 is stimulated at a low level of voltage, current and/or power in step S1, below the level needed to transfer wireless power to a wireless power receiver, but sufficient to detect a foreign object. Using a low stimulus level may reduce the power expended during foreign object detection. In some embodiments, the transmitter coil 10 may be excited in step S1 by a signal source separate from inverter 3. However, the techniques described herein are not limited in this respect, as in some embodiments the inverter 3 may excite the transmit coil 10 in step S1.

In some embodiments, a relatively low number of frequencies may be probed, such as ten or fewer, or five or fewer, but greater than one or two frequencies. Generating probing signals at a relatively low number of frequencies allows reducing the power expended during foreign object detection and the time involved to make the measurements, and the probing signals at different frequencies may be applied sequentially. Criteria and techniques for determining the probing frequencies are discussed below.

In step S2, a quality factor and/or resonant frequency of the transmit coil may be determined based on the measurements in step S1. To measure quality factor, the measured response points of gain vs. frequency can be fit to a quality factor curve. A plurality of quality factor curves or functions representing such curves may be stored in memory of the wireless power transmitter. They may be curves of gain vs. frequency as discussed above, or curves of another parameter vs. frequency such as voltage, current, phase, etc. The quality factor may be determined by running a curve fitting algorithm on the measured response to find which curve best matches the measured response.

Examples of such calculations are discussed below. Alternatively or additionally, the resonant frequency of the transmit coil may be determined based on the measurements. The resonant frequency may be identified as the frequency at which the peak of the gain vs. frequency curve occurs.

In step S3, the measured quality factor and/or resonant frequency may be compared to an anticipated quality factor and/or resonant frequency. The quality factor and/or resonant frequency may depend upon whether or not a wireless power receiver is present, and may vary based on the characteristics of the wireless power receiver. The wireless power transmitter 1 may store data (e.g., in non-volatile memory) representing quality factors Q for known wireless power receivers and/or an anticipated resonant frequency or frequencies for such receivers. The measured quality factor Q and/or resonant frequency may be compared with the stored data, and if either or both differs from the anticipated value(s) by more than a threshold amount the measured quality factor and/or resonant frequency may be indicative of the presence of a foreign conductive object 20. As another example, the wireless power transmitter 1 may receive data from the wireless power receiver 11 indicating the quality factor Q of the wireless power receiver 11. The measured quality factor Q may be compared with the received quality factor Q of the receiver, and if it differs from that of the receiver by more than a threshold amount the measured quality factor may be indicative of the presence of a foreign object 20. As another example, the measured resonant frequency may be compared with an anticipated resonant frequency, and if it differs from the anticipated resonant frequency by more than a threshold amount it may be indicative of the presence of a foreign object 20. Alternatively, both the measured quality factor Q and the measured resonant frequency, and if either or both differs from the anticipated value by more than a threshold, it may be determined to be indicative of the presence of a foreign object 20.

Figure 4A:
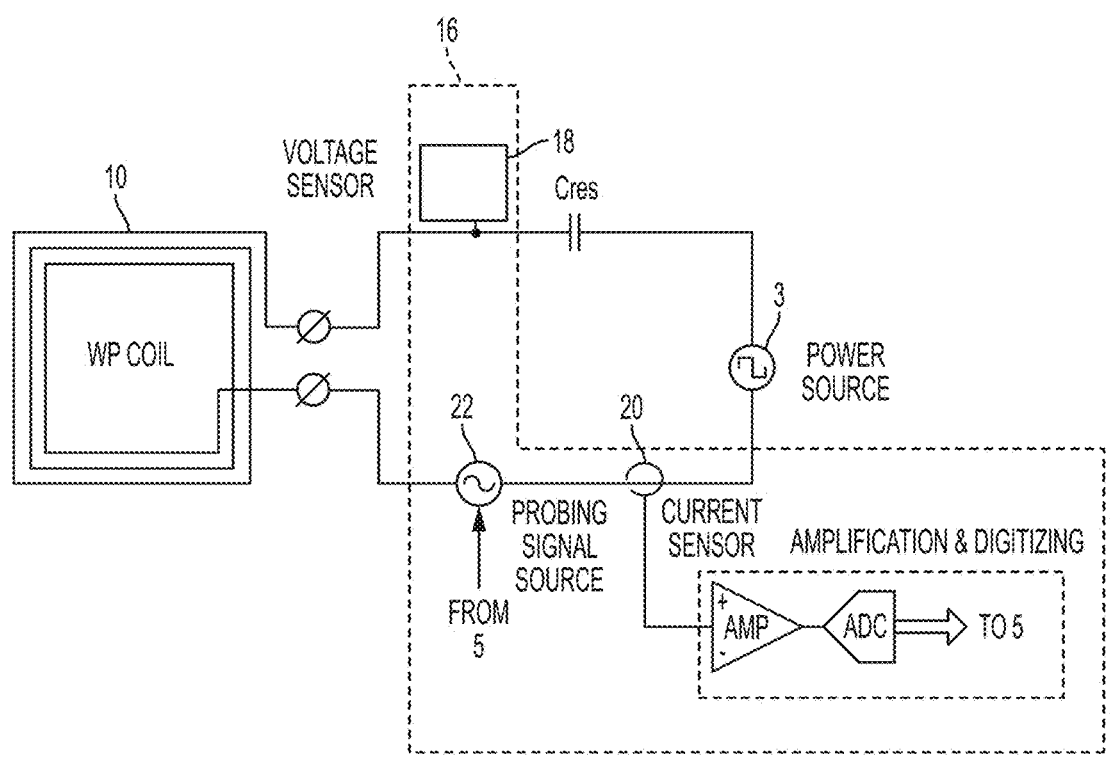
FIGS. 4A-4C show examples of a probing circuit.
Figure 4B:
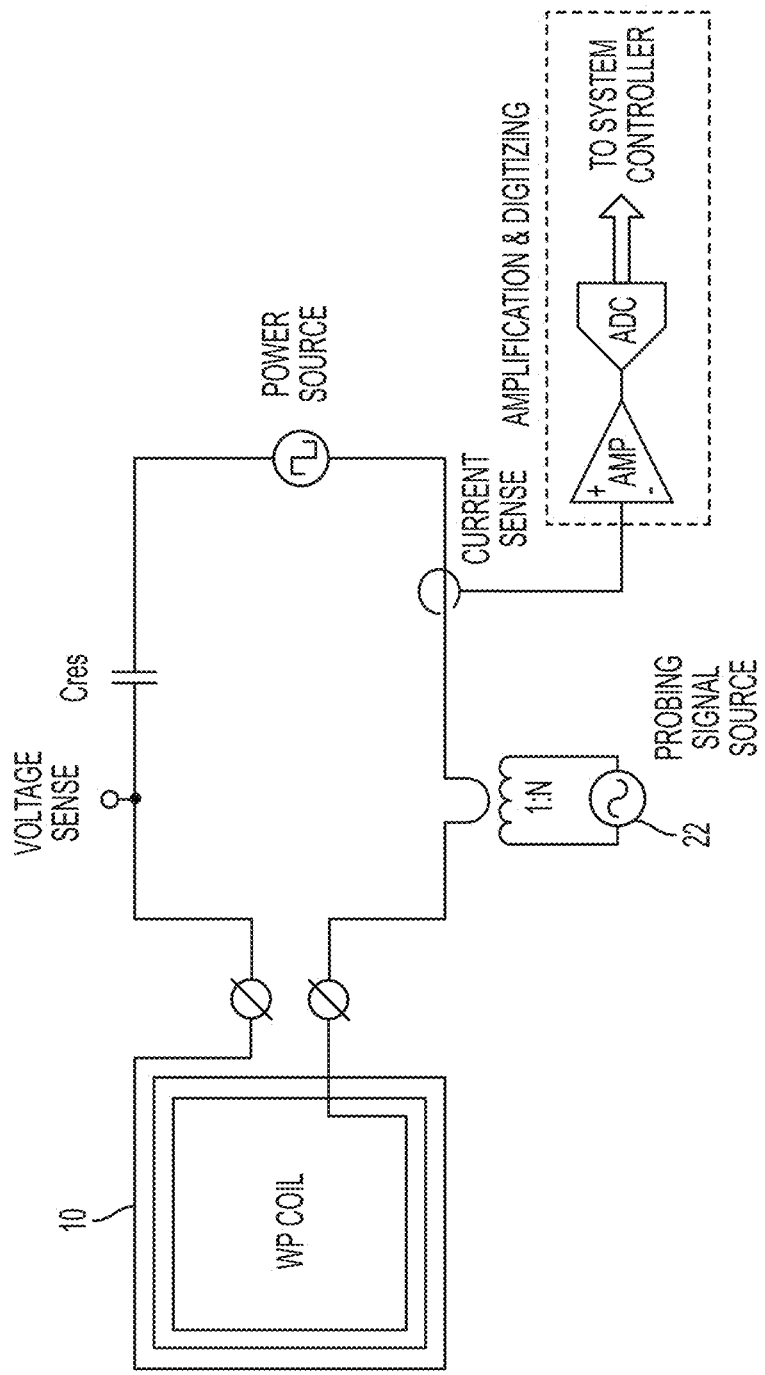
Figure 4C:
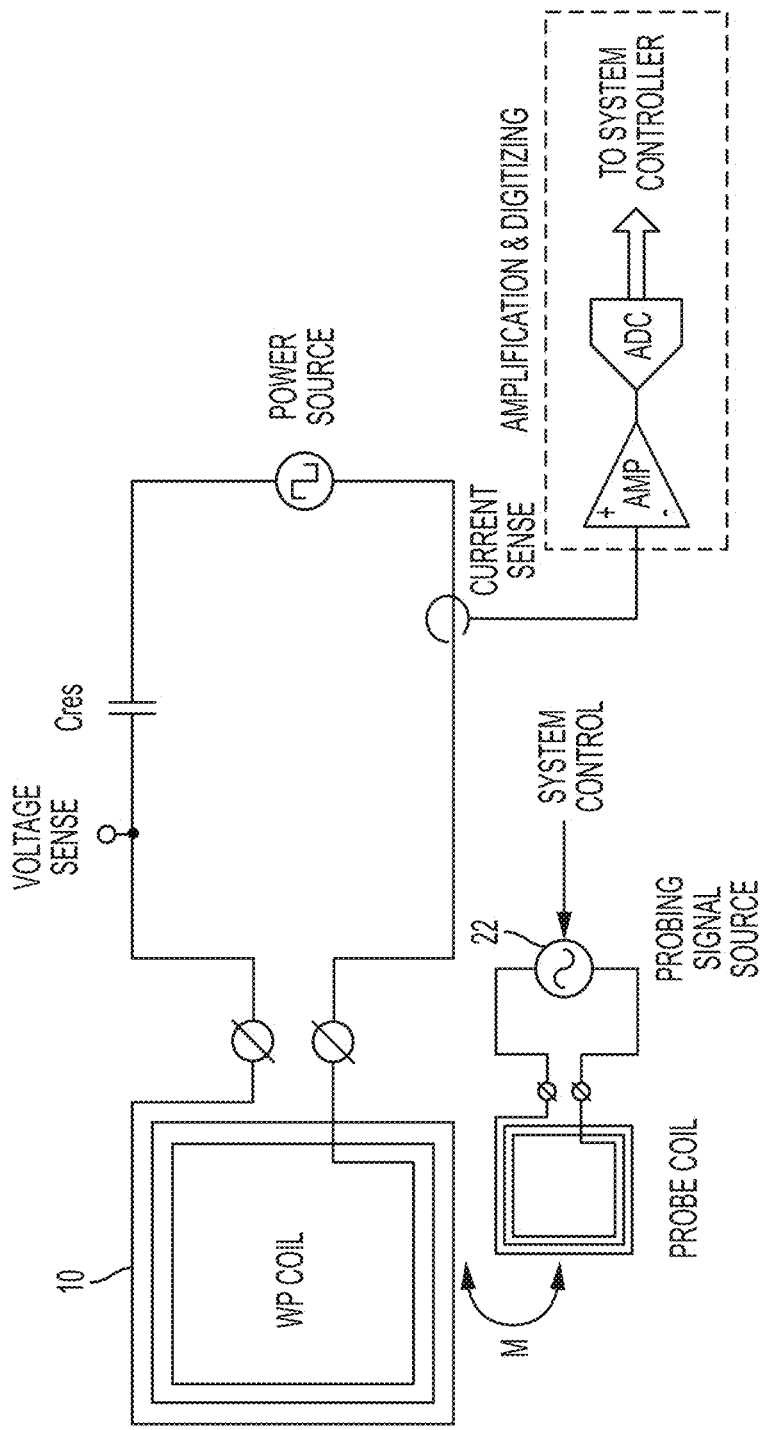
Figure 5A:
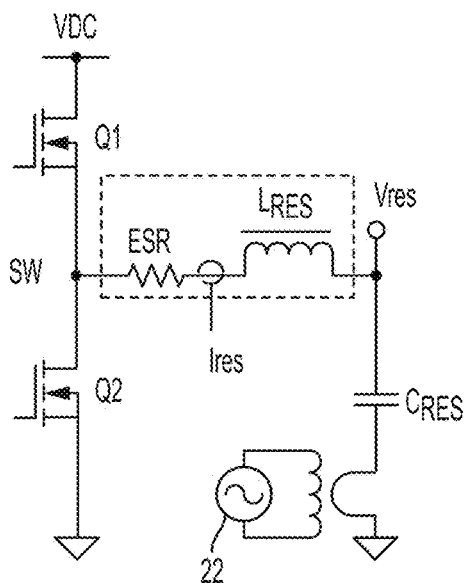
FIGS. 5A-5C show examples of how a probing signal source circuit may be coupled to the transmit coil, and different inverter configurations.
Figure 5B:
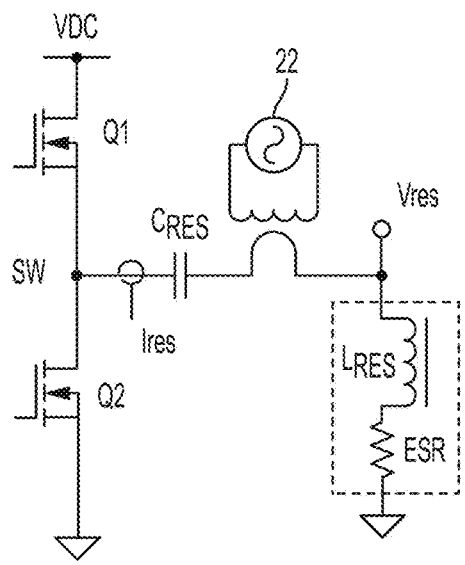
Figure 5C:
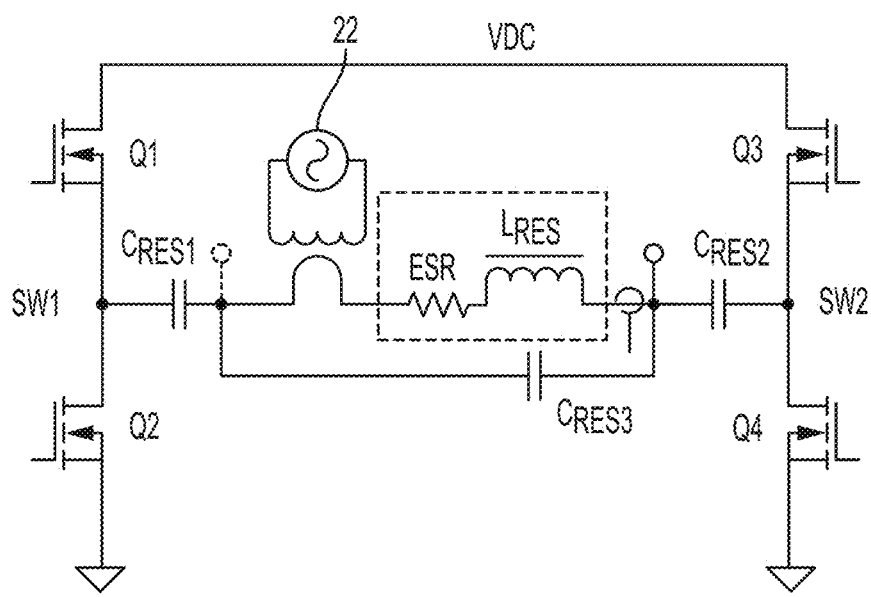

In step S4, wireless power transmission by the wireless power transmitter 1 may be enabled or inhibited based on the result of the analysis. If the measured quality factor Q and/or resonant frequency is outside of an acceptable range, wireless power transmission may be inhibited. If within an acceptable range, power transmission may be enabled, and the wireless power transmitter 1 may be allowed to enter the power transmission mode. The quality factor Q considered acceptable may be based on quality factor provided by a wireless power receiver to the wireless power transmitter via in-band or out-of-band communication FIGS. 4A-4C show examples of a probing circuit 16. In FIG. 4A, the probing circuit 16 includes a probing signal source circuit 22, a voltage sensor 18, a current sensor 20 and amplifying and digitizing circuitry. The probing signal source circuit 22 may include any suitable circuitry for generating a signal of a selected frequency. The frequency and/or magnitude may be selected by controller 5, which controls the probing signal source circuit 22 to generate the signal (e.g., a voltage or current) to excite the transmitter coil 10. The voltage sensor 18 may be any suitable voltage sensor, and may measure any suitable voltage of the transmit coil 10 and/or drive circuit 7. The current sensor 20 may be any suitable current sensor, such as a hall effect sensor, a voltage sensor in combination with a resistor, or any other suitable circuitry for measuring the current. Any suitable measurement may be made by probing circuit 16, such as a measurement of current, voltage or both. The measurements may be made in analog or digital form. FIG. 4B shows an example of a probing signal source circuit 22 that is coupled to the signal path of the transmit coil 10 via a transformer. Any suitable turns ratio may be used. FIG. 4C shows an embodiment in which the probing source circuit 22 is coupled to a probe coil that is inductively coupled to the transmit coil 10. FIGS. 5A and 5B show ways in which the probing signal source circuit 22 may be coupled to the transmit coil 10, and illustrates inverter 3 as a half-bridge inverter including transistors Q1 and Q2. The switch Q1 has high impedance and switch Q2 has low impedance during steps S1 and S1. The matching network 13 is represented by Cres. FIG. 5C shows an example of how the probing signal source circuit 22 may be coupled to the transmit coil 10. In FIG. 5C, the inverter 3 has a full-bridge configuration of transistors Q1-Q4. Switches Q1, Q3 have high impedance while switches Q2 and Q4 have low impedance during steps S1 and S2.

In some embodiments, the probing signal source circuit 22 may be omitted and the transmit coil may be excited by inverter 3 for performing foreign object detection. If the transmit coil 10 is stimulated at a lower level for foreign object detection than during wireless power transfer, the lower power level may be achieved in any suitable way, such as reducing the supply voltage provided to the inverter 3.

Figure 6:
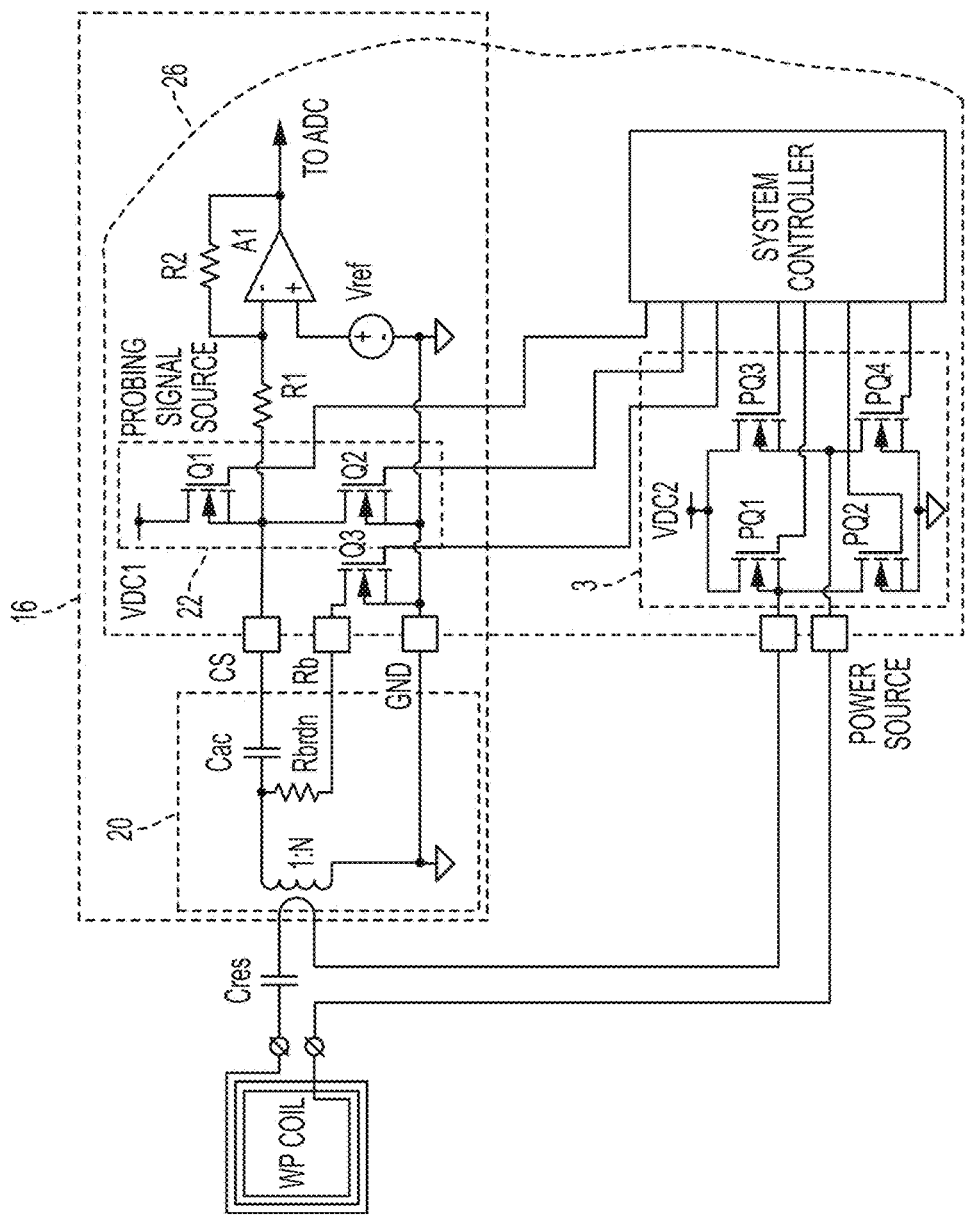
FIG. 6 shows an application specific integrated circuit (ASIC) implementation in which a portion of the probing circuit is implemented on an integrated circuit.

FIG. 6 shows an application specific integrated circuit (ASIC) implementation in which a portion of the probing circuit 16 is implemented on an integrated circuit 26. In this example, the probing signal source circuit 22, amplifier A1, and ADC of the probing circuit 16 are formed on integrated circuit 26. In this example, the probing signal source circuit 22 is an inverter implemented by transistors Q1 and Q1 which injects a voltage to excite the transmit coil 10. A current sensor 20 is inductively coupled to the sense the current through the transmit coil 10. The measured current is transformed into a voltage, amplified by amplifier A1 and digitized by an ADC. As illustrated in FIG. 6, inverter 3 may be a full-bridge class D amplifier that is also implemented on integrated circuit 26. However, inverter 3 may be any suitable type of inverter, such as a class D half bridge amplifier, or a class E amplifier, any of which may be implemented on-chip, off, chip, or a combination of both. In the circuit such as that shown in FIG. 6, any components may be implemented on-chip or off-chip as desired, and as allowed by sizing constraints.

Figure 7:
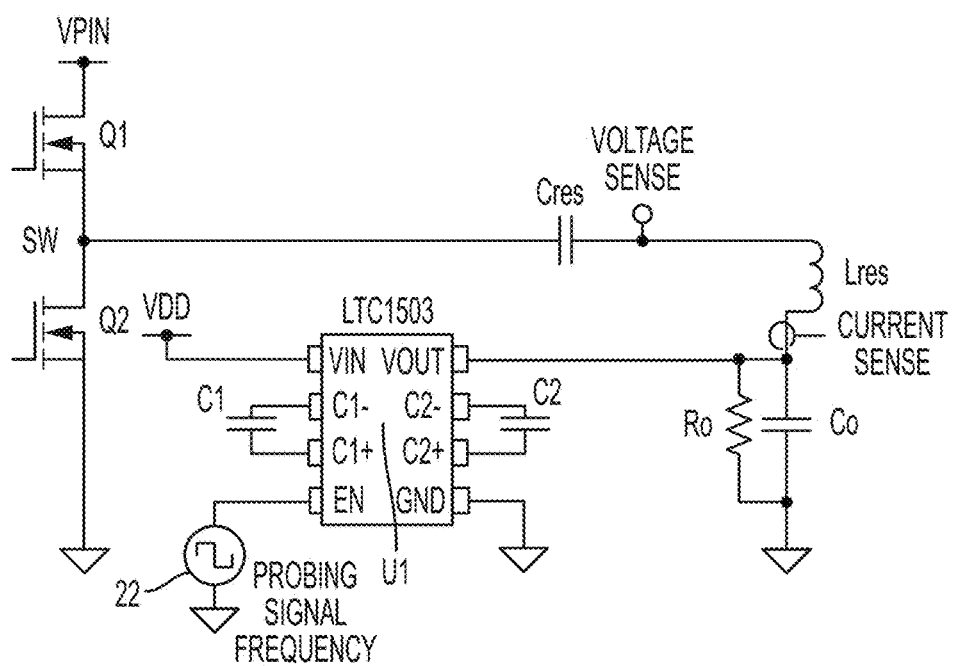
FIG. 7 shows an example of a probing signal source circuit implemented by a charge pump.
Figure 8:
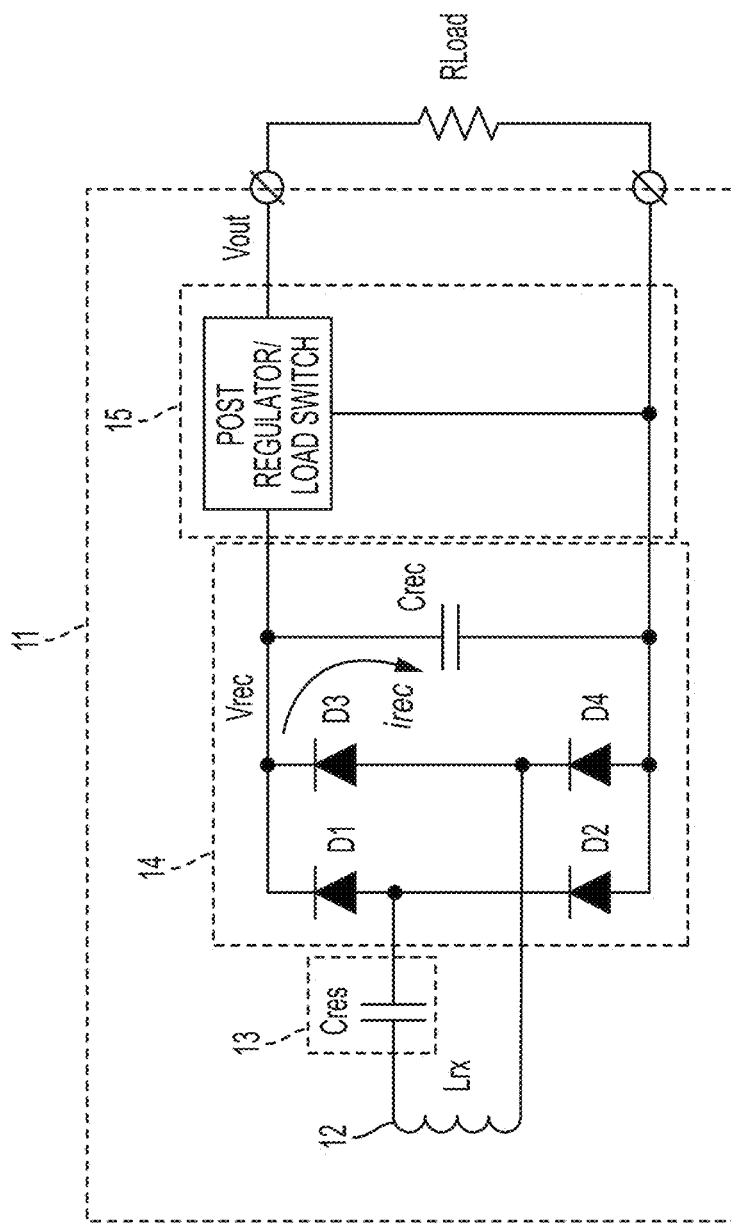
FIG. 8 shows an example of wireless power reception circuitry for a wireless power receiver.

FIG. 7 shows an example of a probing signal source circuit 22 implemented by a charge pump. Charge pump U1 may be driven with a varying stimulus frequency that sweeps the resonance range of the transmitter coil. The charge pump imposes an output voltage on C2 that is placed in series with the resonance network. The capacitor does not present significant impedance in the resonance network operating frequency range, thus not affecting the performance of wireless power transfer. The resonance voltage or current of the resonance network may be registered and processed to derive Q-factor FIG. 8 shows an example of wireless power reception circuitry for a wireless power receiver 11. Matching network 13 is implemented by a capacitor $C_{RES}$. Rectifier 14 is implemented by a full-bridge diode rectifier with an output filter capacitor Crec having a voltage Vrec across it. DC/DC converter 15 is implemented by a post regulator/load switch that produces $V_{out}$.

Having shown examples of drive circuit 7 and an example of wireless power reception circuitry for a wireless power receiver 11, examples of ways in which the method of FIG. 3 may be applied thereto will be described.

In some embodiments, it is desirable to limit the amount of energy transferred to the drive circuit to limit power dissipation when performing foreign object detection. The amount of energy transferred may be limited by applying a lower stimulus level during foreign object detection as compared to its value during power transmission. Alternatively or additionally, the switching frequency may be selected to control the amount of energy transferred. The farther away the switching frequency of the inverter 3 is from the resonant frequency of the drive circuit 7, the less energy will be transferred into the drive circuit 7 per unit time. The amount of time for which inverter 3 is switched also affects the amount of energy transferred. Reducing the amount of time for which inverter 3 is switched can reduce the amount of energy transferred to drive circuit 7.

The present inventor has recognized and appreciated that when a wireless power receiver 11 is present the decay of the resonance can vary depending on the state of charge of the filter capacitor of the rectifier filter capacitor Crec (FIG. 8). If Crec is not charged to a point where the diodes of the rectifier 14 are reverse-biased, the resonance at the wireless power transmitter 1 may be loaded by the wireless power receiver to charge Crec. This can affect the rate at which the resonance of the transmitter decays, which may affect the measurement of the decay, and thus impact the accuracy of foreign object detection. Accordingly, in some embodiments, prior to making a measurement the transmit coil 10 may be excited such that the wireless power receiver receives enough power to charge capacitor Crec to the point where the diodes of rectifier 14 are reverse-biased. This can prevent capacitor Crec from interfering with the quality factor measurement.

Figure 9:
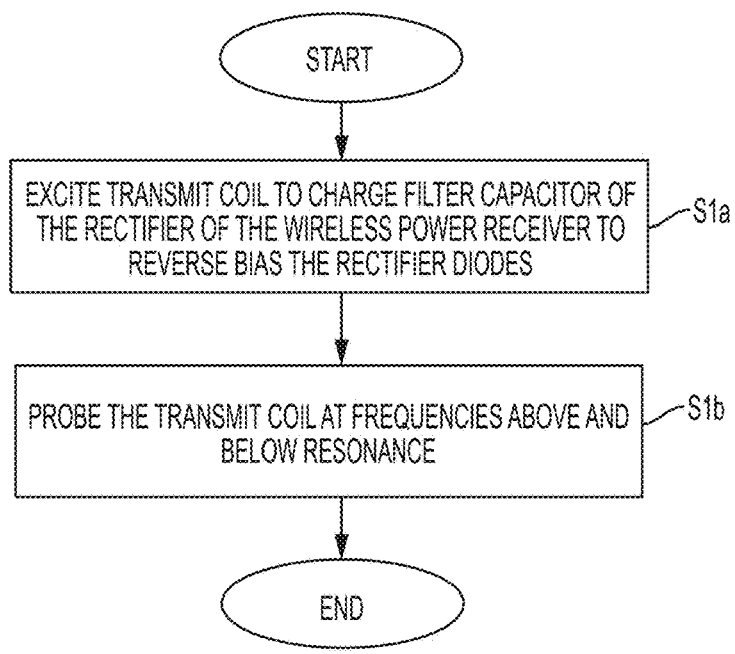
FIG. 9 shows a flow chart illustrating how step S1 of FIG. 3 may be performed, according to some embodiments.

FIG. 9 shows a flow chart illustrating how step S1 of FIG. 3 may be performed, according to some embodiments. In step S1a, prior to making a measurement the transmit coil 10 is excited such that the wireless power receiver receives enough power to charge capacitor Crec to the point where the diodes of rectifier 14 are reverse-biased. In some embodiments, step S1a may be performed at the resonant frequency to improve power transfer and reduce the time needed to charge the capacitor Crec. Step S1a may be referred to as a "preamble." The preamble may be impressed on the transmit coil once at the beginning of a sequence of probing measurements at different frequencies, or before each probing measurement at each probing frequency.

Figure 10A:
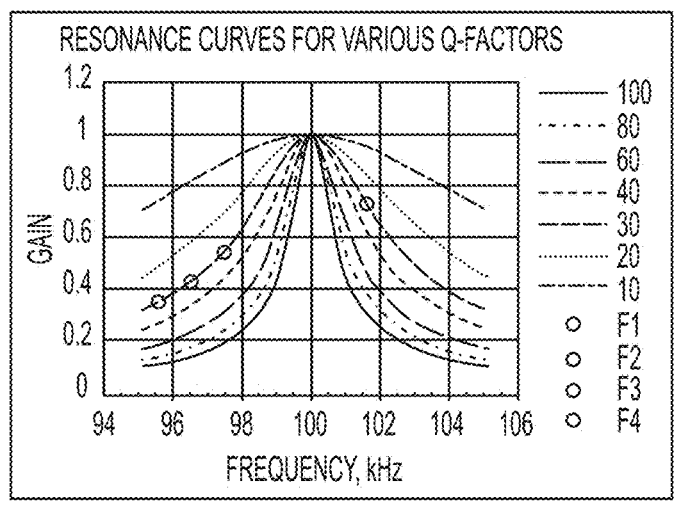
FIGS. 10A-10C illustrate how a number of frequencies may be probed to make a quality factor measurement.
Figure 10B:
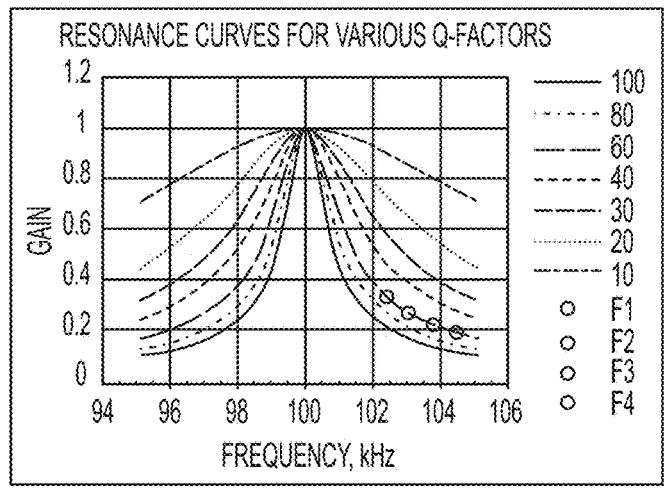
Figure 10C:
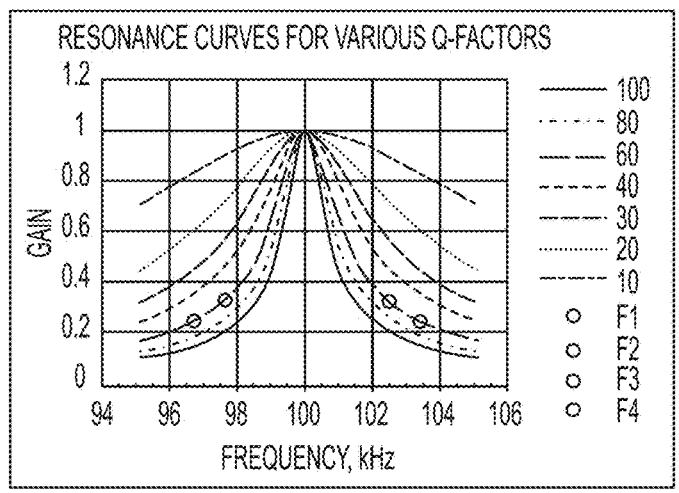

In step S1b, the transmit coil 10 is probed at frequencies above and below the resonant frequency of the combined transmit coil 10 and matching network 6. In some embodiments, step S1b may entail probing the transmit coil 10 at a relatively small number of frequencies, such a less than 10 frequencies or less than 5 frequencies, for example. The inventor has developed techniques for appropriately selecting the frequencies that are probed so that an accurate measurement of the quality factor Q may be obtained by probing at a relatively low number of frequencies. FIGS. 10A-10C illustrate a number of examples. In these examples, the resonant frequency is approximately 100 kHz. However, the techniques described herein are not limited to the particular resonant frequency used. In some embodiments, the resonant frequency may be 6.78 MHz, such as in MR systems, for example. In some embodiments, at least one frequency is probed on each side of the resonance. FIG. 10A shows that the transmit coil is probed at three frequencies below resonance, and one frequency is probed above resonance. FIG. 10C shows that two frequencies are probed above resonance and two frequencies are probed below resonance. In some embodiments, a plurality of frequencies may be probed on one side of the resonance. For example, FIG. 10B shows that four frequencies may be probed on one side of the resonance. In some embodiments, probing at frequencies close to the resonant frequency can increase accuracy of the quality factor measurement, as the resonance curves have a higher slope close to the resonance as compared to far away from resonance. In some embodiments, the frequencies that are probed may be in a range between 0.5 times the resonant frequency and 1.5 times the resonant frequency, such as between 0.9 times the resonant frequency and 1.1 times the resonant frequency, or even closer, such as between 0.95 times the resonant frequency and 1.05 times the resonant frequency.

The probing frequencies can be probed in any suitable order. In some embodiments, they may be scanned from low frequency to high frequency. In some embodiments, they may be scanned from high frequency to low frequency. In some embodiments, one or more frequencies may be probed below resonance, followed by probing one or more points above resonance, followed by probing one or more points below resonance. In some embodiments, one or more frequencies may be probed above resonance, followed by probing one or more points below resonance, followed by probing one or more points above resonance. In some embodiments, during a frequency scan from lower to higher the preamble beacon has frequency that is higher than the "measuring" frequency by which it is followed. In some embodiments, during a frequency scan from higher to lower the preamble beacon has frequency that is lower than the "measuring" frequency by which it is followed.

The probing frequencies may be selected prior to the start of probing, or adaptively based upon one or more measurements. Adaptively selecting the frequencies can allow frequencies to be chosen that improve the accuracy of the quality factor measurement and/or confirm the quality factor measurement. For example, referring to FIG. 10C, two frequencies below the resonance may be probed. If the gain is higher at the higher of the two probing frequencies, this may verify the measurements are both below the resonant frequency. However, if the gain at the higher probing frequency is lower than that measured at the lower probing frequency, it may be determined that the two measurements are not both below the resonance, as anticipated. Different probing frequencies may be selected to obtain a better measurement.

In some embodiments, measurements on one side of the resonance may be verified by measurements on the other side of the resonance. For example, based on measuring the two points below resonance in FIG. 10C, an estimate of the actual resonant frequency may be determined. Based on that estimate of the resonant frequency or a stored value indicating the anticipated, nominal resonant frequency, two probing frequencies may be selected on the opposite side of the resonance. A second estimate of the resonant frequency may then be calculated based on the measurements above resonance. If the two estimates of the resonant frequency are close together (e.g., within a threshold amount), the measurement is validated. Then, the four measured points may be fit to a quality factor curve to determine the quality factor.

In some embodiments, the measured points of gain vs. frequency may be fit to a quality factor curve using the following system of equations, with W0 being the resonant frequency in kHz, Wi being a probing frequency in kHz and Vi being the corresponding measured gain for six probing frequencies.

| Guess Values | $Q := 100 \quad W0 := 100$ Initial Assumpptions |
| --- | --- |
| | Given: |
| | $W1 := 96.569 \quad V1 := 0.142$ |
| | $W2 := 97.537 \quad V2 := 0.197$ |
| | $W3 := 98.0248 \quad V3 := 0.243$ |
| | $W4 := 102.015 \quad V4 := 0.243$ |
| | $W5 := 102.525 \quad V5 := 0.197$ |
| | $W6 := 103.55 \quad V6 := 0.142$ |

System of Equitations

Constraints $$\frac{1}{\sqrt{1+Q^2\left(\frac{W1}{W0}-\frac{W0}{W1}\right)^2}} = V1 \quad \frac{1}{\sqrt{1+Q^2\left(\frac{W4}{W0}-\frac{W0}{W4}\right)^2}} = V4$$

$$\frac{1}{\sqrt{1+Q^2\left(\frac{W2}{W0}-\frac{W0}{W2}\right)^2}} = V2 \quad \frac{1}{\sqrt{1+Q^2\left(\frac{W5}{W0}-\frac{W0}{W5}\right)^2}} = V5$$

$$\frac{1}{\sqrt{1+Q^2\left(\frac{W3}{W0}-\frac{W0}{W3}\right)^2}} = V3 \quad \frac{1}{\sqrt{1+Q^2\left(\frac{W6}{W0}-\frac{W0}{W6}\right)^2}} = V6$$

Solver $$\text{find}\{Q, W0\} = \begin{bmatrix} 99.881 \\ 99.997 \end{bmatrix}$$

Figure 11:
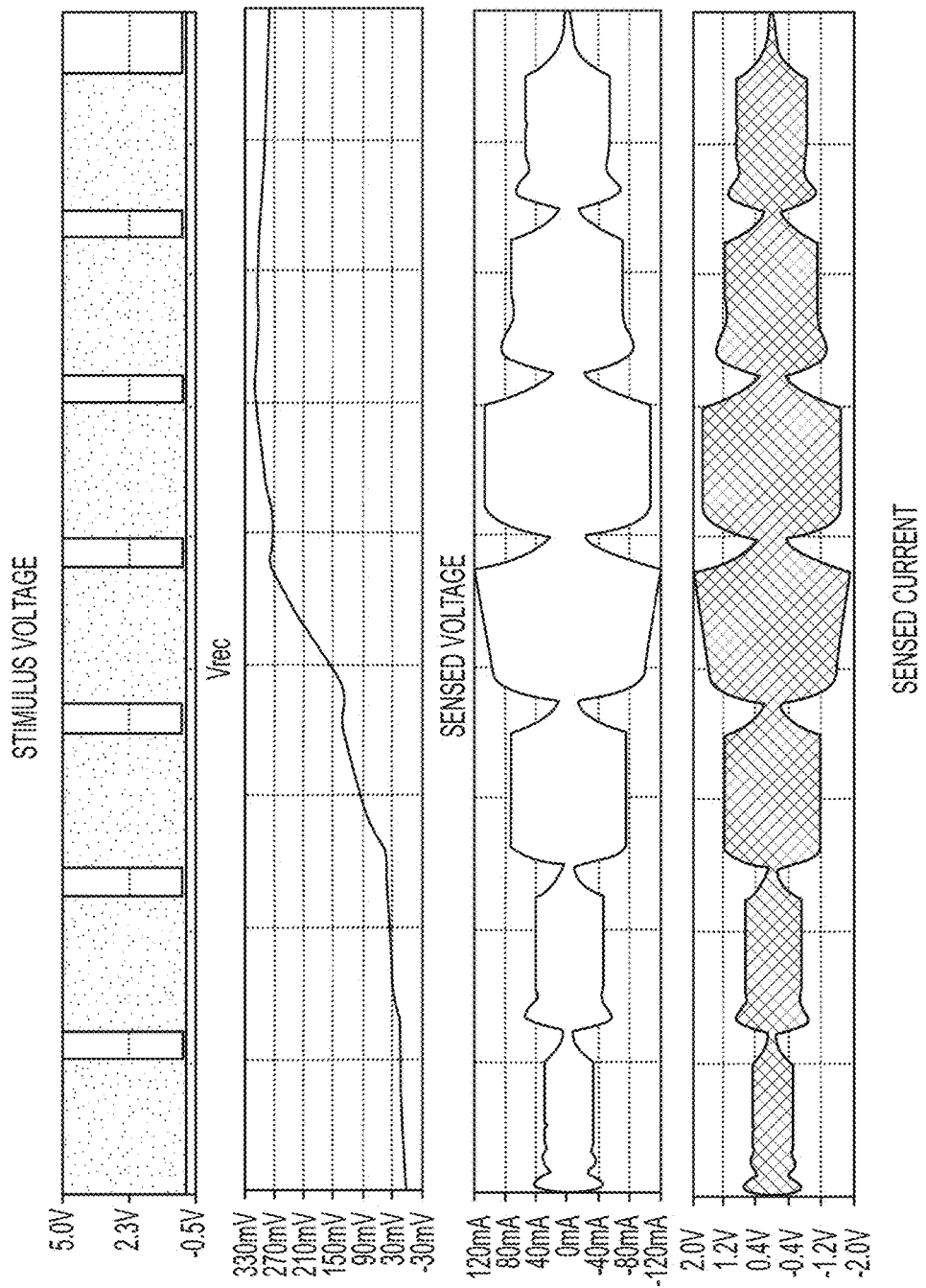
FIG. 11 shows waveforms illustrating the response when the transmit coil is energized with probing signals of different frequencies.

FIG. 11 shows waveforms illustrating the response when the transmit coil is energized with probing signals of different frequencies. More specifically, FIG. 11 shows a frequency sweep with a stimulus voltage from below the resonant frequency to above the resonant frequency. As shown, the magnitude of the current and voltage sensed in the transmit coil has the highest magnitude in the middle of the plot, which corresponds to probing frequencies near the resonant frequency. Since no preamble was applied to charge the rectifier filter capacitor Crec, the voltage across it Vrec slowly increases as the probing signals are applied by the wireless power transmitter. The response of the transmit coil may be affected by the variation in voltage across the rectifier filter capacitor Crec, which can impact the measurement.

Figure 12:
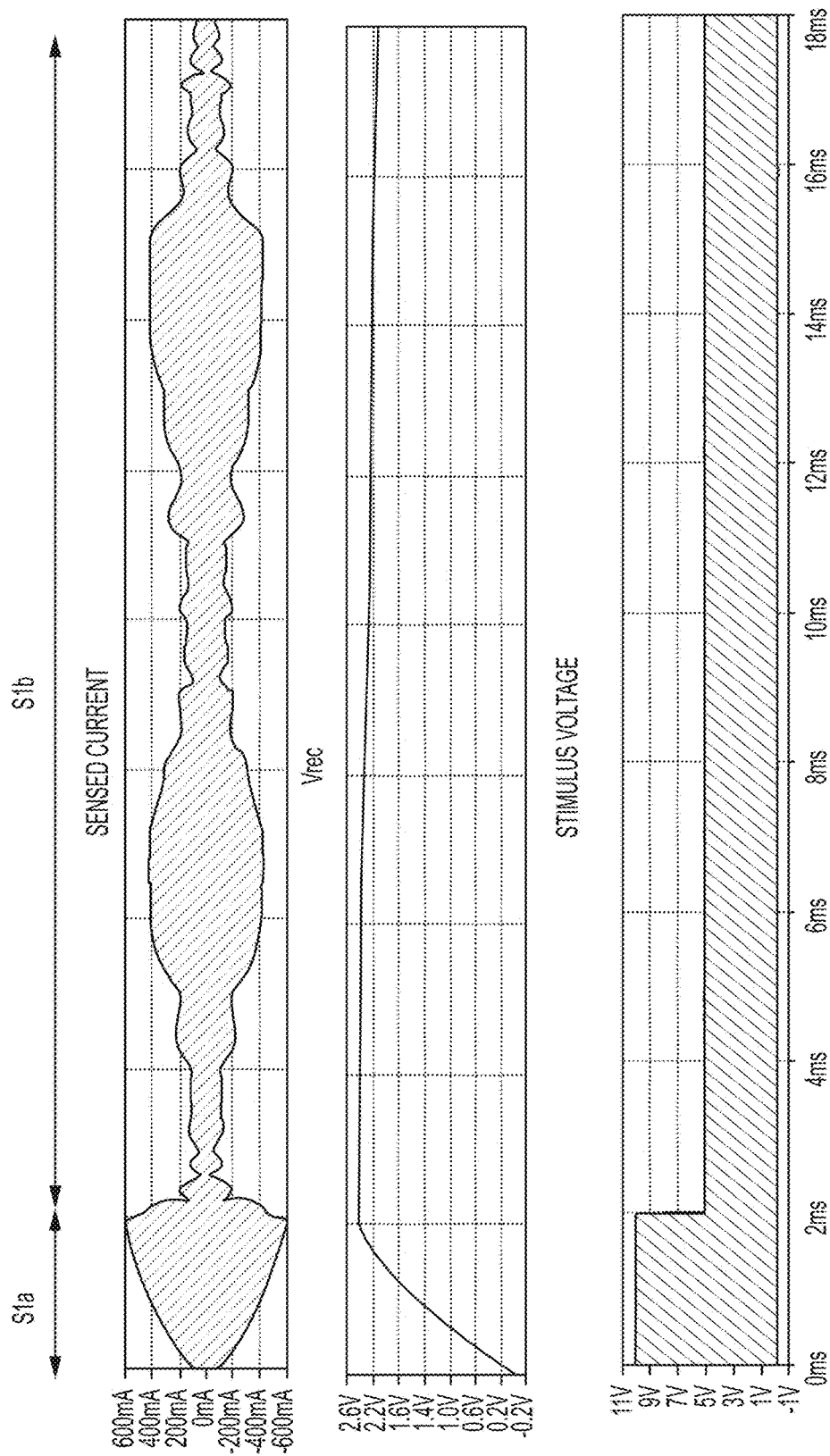
FIG. 12 shows a waveform in which a preamble is applied prior to charge the rectifier filter capacitor Crec prior to making a measurement.

FIG. 12 shows a waveform in which a preamble is applied prior to charge the rectifier filter capacitor Crec prior to making a measurement. In this example, during the preamble in step S1a, the voltage VDC applied to power the inverter is increased (e.g., to 10V) to provide additional energy to charge the rectifier filter capacitor Crec more quickly. As shown, the rectifier filter capacitor Crec is fully charged by the end of the preamble in step S1a and stays constant during step S1b, keeping the diodes of the rectifier reverse-biased. Accordingly, the charging of the rectifier filter capacitor Crec does not affect the measurement in step S1b. During step S1b, the voltage VDC applied to power the inverter may be reduced (e.g., to 5V) to reduce power consumption during step S1b. Varying the voltage VDC applied to power the inverter is only one way to increase the energy delivered during step S1a. In some embodiments, the energy may be increased in step S1a using another technique, such as setting the switching frequency of the inverter equal to or near the resonant frequency of the transmit coil, in addition to or as an alternative to increasing the voltage VDC applied to power the inverter.

Figure 13:
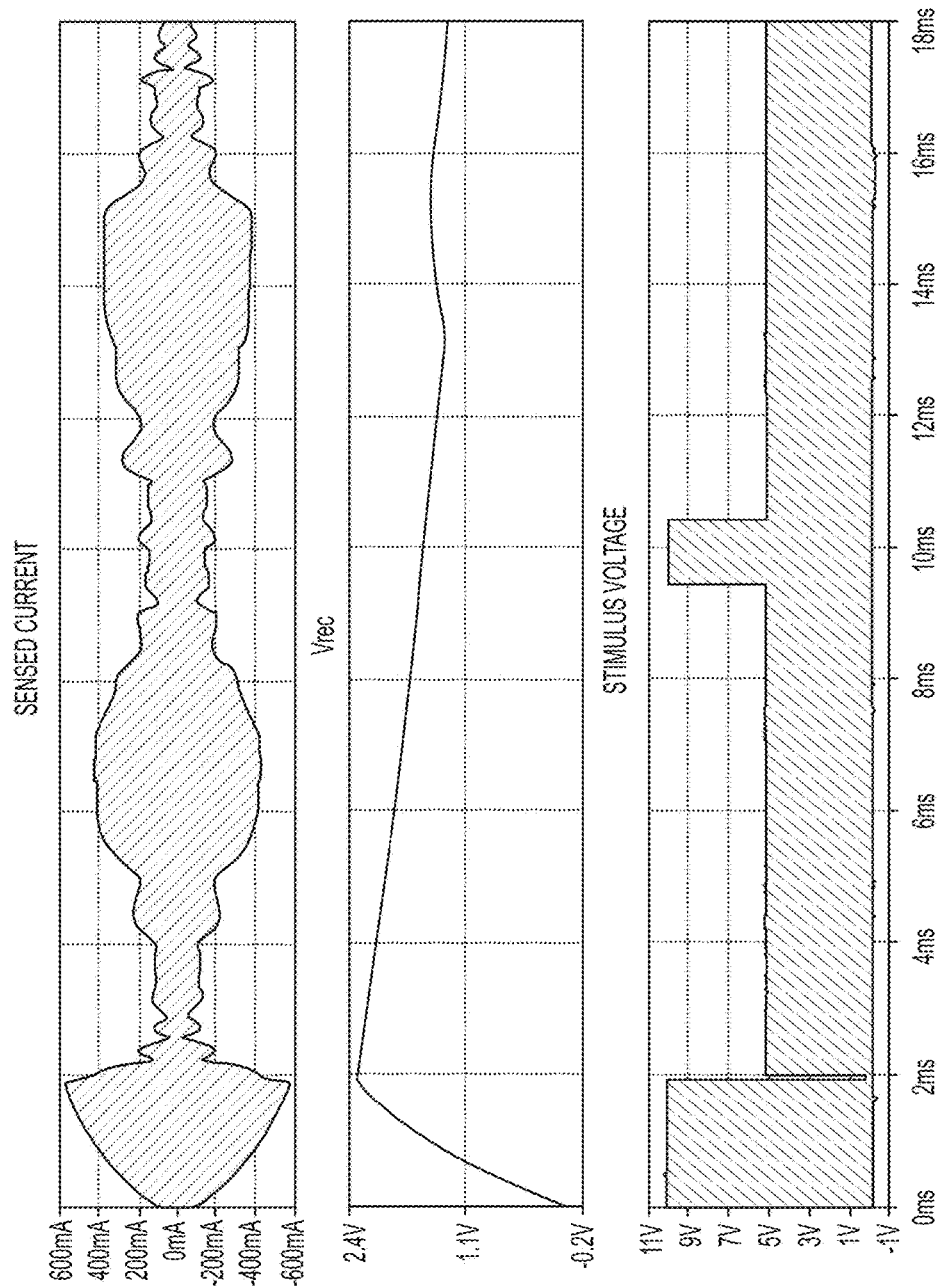
FIG. 13 shows a waveform in which significant leakage current flows from rectifier filter capacitor Crec.

FIG. 13 shows a waveform in which significant leakage current flows from rectifier filter capacitor Crec, causing the voltage across it to decrease during step S1b, which may affect the measurement.

Figure 14:
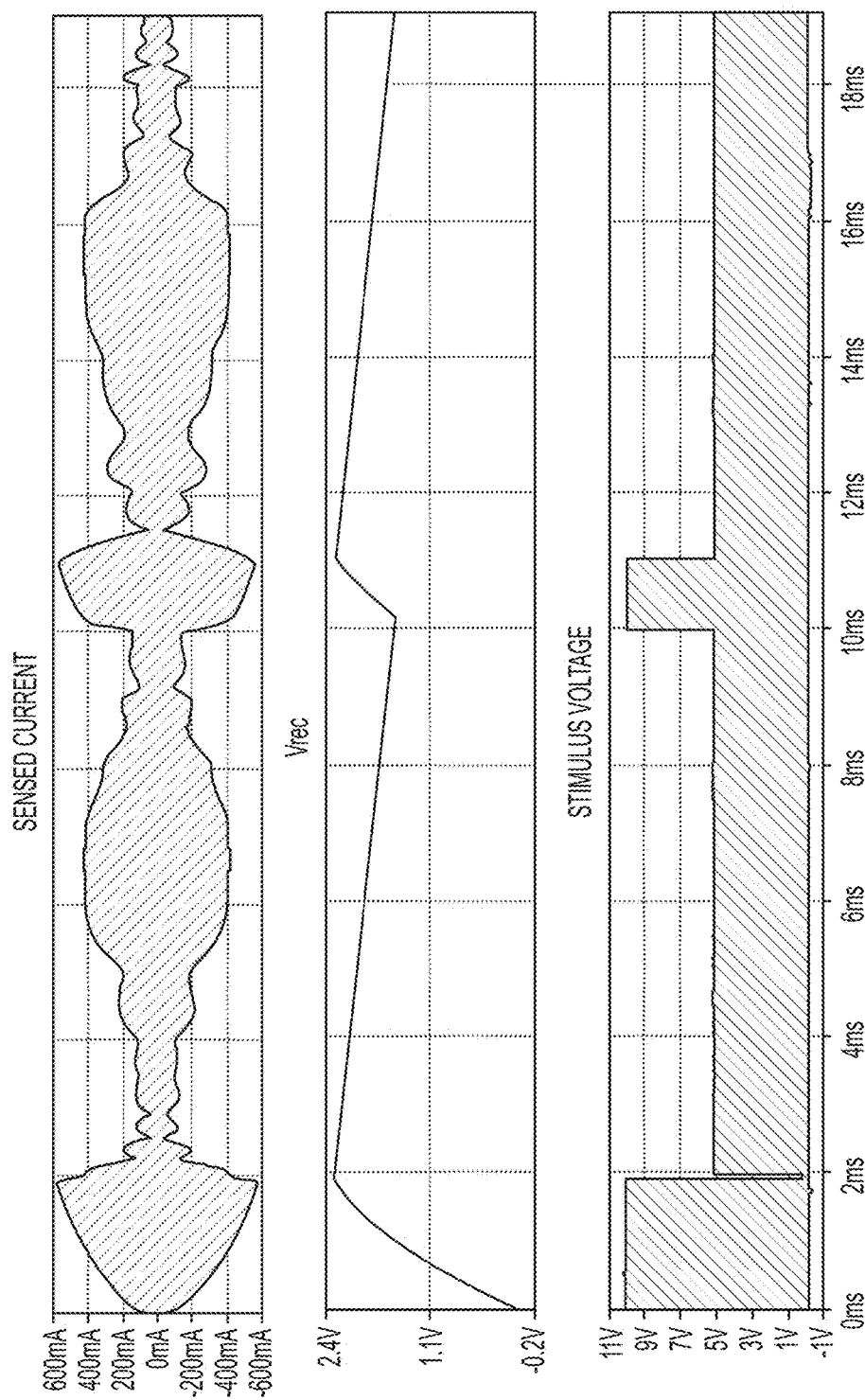
FIG. 14 shows one way of replenishing the charge stored in rectifier filter capacitor Crec between measurements.

FIG. 14 shows one way of addressing this problem. To replenish the charge stored in rectifier filter capacitor Crec, after measurement at one or more frequencies the energy delivered by the transmitter is increased before performing further measurements. In this example, the voltage VDC applied to power the inverter is increased for a period of time to replenish the charge stored in rectifier filter capacitor Crec between measurements. However, this is merely by way of example, as the energy may be increased in a different way, as discussed above.

Figure 15:
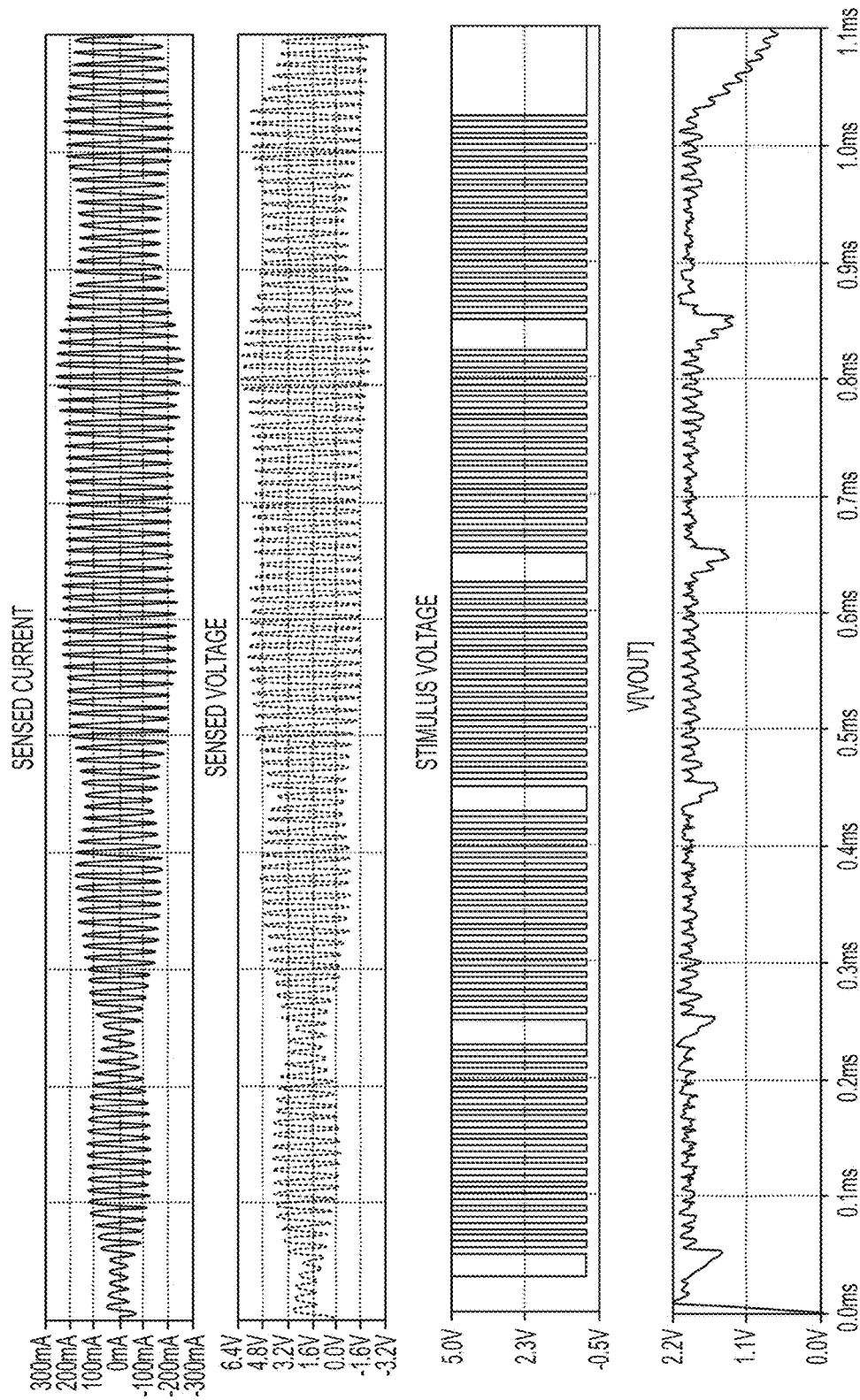
FIG. 15 shows waveforms illustrating the operation of the circuit of FIG. 7, according to some embodiments.

FIG. 15 shows waveforms illustrating the operation of the circuit of FIG. 7, according to some embodiments. The charge pump U1 may be driven with probing signals of different frequencies to the frequency range near the resonant frequency of the transmitter coil. The charge pump may imposes an output voltage on C2 that is placed in series with the resonance network The capacitor C2 does not present significant impedance in the resonance network operating frequency range, thus not affecting the performance of the wireless power transmitter.

As discussed above, a wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A foreign object detection method for a wireless power transmitter having a matching network and transmit coil, the method comprising:
    (A) stimulating the transmit coil with electrical signals at a plurality of frequencies;
    (B) measuring a response of the transmit coil to the electrical signals;
    (C) determining a quality factor and/or resonant frequency of the transmit coil based upon the measured response; and
    (D) analyzing the quality factor and/or resonant frequency to determine whether a foreign object is coupled to an electromagnetic field generated by the transmit coil, wherein the wireless power transmitter energizes the transmit coil sufficiently to charge a capacitor of a rectifier of a wireless power receiver to reverse-bias diodes of the rectifier prior to measuring the response of the transmit coil.

2. The foreign object detection method of claim 1, wherein the plurality of frequencies comprises no more than ten frequencies.

3. The foreign object detection method of claim 2, wherein the plurality of frequencies comprises no more than five frequencies.

4. The foreign object detection method of claim 1, wherein the plurality of frequencies are between 0.5 and 1.5 times an anticipated resonant frequency of the transmit coil.

5. The foreign object detection method of claim 1, wherein the plurality of frequencies are between 0.9 and 1.1 times an anticipated resonant frequency of the transmit coil.

6. The foreign object detection method of claim 1, wherein at least one of the frequency of the plurality of frequencies is determined adaptively based upon a measured response at one or more other frequencies.

7. The foreign object detection method of claim 1, wherein at least one first frequency of the plurality of frequencies is below a resonant frequency of the transmit coil and at least one second frequency of the plurality of frequencies is above the resonant frequency of the transmit coil.

8. The foreign object detection method of claim 1, further comprising calculating a first estimate of a resonant frequency of the transmit coil based on a first plurality of measurements, calculating a second estimate of the resonant frequency of the transmit coil based on a second plurality of measurements, and comparing the first and second estimates.

9. The foreign object detection method of claim 1, wherein (B) comprises measuring a voltage of the transmit coil, a voltage of the matching network, a current of the transmit coil and/or a current of the matching network.

10. The foreign object detection method of claim 1, wherein (C) comprises fitting a quality factor curve to measurement values produced in (B) at different frequencies.

11. The foreign object detection method of claim 1, wherein (D) comprises comparing the quality factor and/or the resonant frequency to an acceptable quality factor and/or resonant frequency for wireless power transmission.

12. The foreign object detection method of claim 1, wherein the acceptable quality factor and/or resonant frequency is at least in part derived from a quality factor value and/or resonant frequency value provided to the wireless power transmitter by a wireless power receiver via in-band or out-of-band communication.

13. The foreign object detection method of claim 1, wherein in (A) the transmit coil is stimulated at a level below that which is necessary to transmit wireless power to a wireless power receiver.

14. At least one non-transitory computer readable storage medium having stored thereon instructions, which, when executed by a processor, perform a foreign object detection method for a wireless power transmitter having a matching network and transmit coil, the method comprising:
    (A) stimulating the transmit coil with electrical signals at a plurality of frequencies;
    (B) measuring a response of the transmit coil to the electrical signals;
    (C) determining a quality factor and/or resonant frequency of the transmit coil based upon the measured response; and
    (D) analyzing the quality factor and/or resonant frequency to determine whether a foreign object is coupled to an electromagnetic field generated by the transmit coil, wherein the wireless power transmitter energizes the transmit coil sufficiently to charge a capacitor of a rectifier of a wireless power receiver to reverse-bias diodes of the rectifier prior to measuring the response of the transmit coil.

15. An apparatus that performs foreign object detection, the apparatus comprising:
- a probing circuit configured to stimulate a transmit coil with electrical signals at a plurality of frequencies and measure the response of the transmit coil to the electrical signals; and
- a controller configured to determine a quality factor and/or resonant frequency of the transmit coil based upon the measured response and analyze the quality factor and/or resonant frequency to determine whether a foreign object is coupled to an electromagnetic field generated by the transmit coil,
- wherein the probing circuit is configured to energize the transmit coil sufficiently to charge a capacitor of a rectifier of a wireless power receiver to reverse-bias diodes of the rectifier prior to measuring the response of the transmit coil.

16. The apparatus of claim 15, wherein the probing circuit comprises a voltage sensor, a current sensor, or both a voltage sensor and a current sensor.

17. The apparatus of claim 15, wherein the probing circuit comprises a charge pump.

18. The apparatus of claim 15, wherein the plurality of frequencies comprises no more than ten frequencies.

19. The apparatus of claim 15, wherein the plurality of frequencies are between 0.5 and 1.5 times a resonant frequency of the transmit coil.

20. The apparatus of claim 15, wherein the controller is configured to adaptively determine at least one of the plurality of frequencies based upon a measured response at one or more other frequencies.

21. The apparatus of claim 15, wherein at least one first frequency of the plurality of frequencies is below a resonant frequency of the transmit coil and at least one second frequency of the plurality of frequencies is above the resonant frequency of the transmit coil.

22. The apparatus of claim 15, wherein the controller is configured to fit a quality factor curve to measurement values produced at different frequencies.

\* \* \* \* \*